(12) United States Patent
Nakamura et al.

(10) Patent No.: US 7,805,062 B2
(45) Date of Patent: *Sep. 28, 2010

(54) TRANSMITTING AND RECORDING METHOD, REPRODUCING METHOD, AND REPRODUCING APPARATUS OF INFORMATION AND ITS RECORDING MEDIUM

(75) Inventors: Masafumi Nakamura, Yokohama (JP); Toshifumi Takeuchi, Yokohama (JP)

(73) Assignee: Hitachi Consumer Electronics Co., Ltd, Tokyo (JP)

( * ) Notice: Subject to any disclaimer, the term of this patent is extended or adjusted under 35 U.S.C. 154(b) by 354 days.

This patent is subject to a terminal disclaimer.

(21) Appl. No.: 12/058,911

(22) Filed: Mar. 31, 2008

(65) Prior Publication Data

US 2008/0225652 A1  Sep. 18, 2008

Related U.S. Application Data

(63) Continuation of application No. 10/733,319, filed on Dec. 12, 2003, now Pat. No. 7,565,061, which is a continuation of application No. 10/252,581, filed on Sep. 24, 2002, now Pat. No. 6,693,966, which is a continuation of application No. 10/051,066, filed on Jan. 22, 2002, now Pat. No. 6,549,579, which is a continuation of application No. 08/463,827, filed on Jun. 5, 1995, now Pat. No. 6,438,172.

(30) Foreign Application Priority Data

Jun. 20, 1994 (JP) ............................... 6-136962

(51) Int. Cl.
H04N 5/76 (2006.01)

(52) U.S. Cl. .................. 386/126; 386/96; 386/112; 386/124

(58) Field of Classification Search .................. 386/126, 386/112, 124, 96; H04N 5/76, 5/91
See application file for complete search history.

(56) References Cited

U.S. PATENT DOCUMENTS 4,703,355 A  10/1987 Cooper (Continued)

FOREIGN PATENT DOCUMENTS

JP  1-154382  6/1989

(Continued)

OTHER PUBLICATIONS

K. Hayashi, CD—From Audio to Personal Computer, pp. 84-89, Corona Publishing Co., Ltd., Tokyo, Japan, Jul. 25, 1990, ISBN 4-339-00579-7 (in Japanese).

(Continued)

Primary Examiner—Aristotelis M. Psitos
(74) Attorney, Agent, or Firm—Antonelli, Terry, Stout & Kraus, LLP.

(57) ABSTRACT

A method of reproducing data from a recording medium, each of the data including reference time information indicating a reference time and including packet data, the method including: reproducing the data from the recording medium; obtaining a difference between respective reference times indicated by the reference time information of the reproduced adjacent data; rearranging the data on a time axis such that a time interval between adjacent data is equal to the obtained reference time difference; and outputting the rearranged data.

2 Claims, 4 Drawing Sheets

U.S. PATENT DOCUMENTS

| | | | |
|---|---|---|---|
| 4,755,889 A | | 7/1988 | Schwartz |
| 4,872,068 A | | 10/1989 | Ishii et al. |
| 4,914,527 A | | 4/1990 | Asai et al. |
| 5,381,275 A | * | 1/1995 | Nitta et al. .................... 360/48 |
| 5,408,331 A | | 4/1995 | Ota |
| 5,424,850 A | | 6/1995 | Inoue et al. |
| 5,434,716 A | | 7/1995 | Sugiyama et al. |
| 5,455,684 A | | 10/1995 | Fujinami et al. |
| 5,502,573 A | | 3/1996 | Fujinami |
| 5,504,585 A | | 4/1996 | Fujinami et al. |
| 5,508,816 A | | 4/1996 | Ueda et al. |
| 5,526,198 A | * | 6/1996 | Dodt et al. .................... 360/48 |
| 5,535,008 A | | 7/1996 | Yamagishi et al. |
| 5,953,489 A | * | 9/1999 | Park ........................... 386/109 |
| 6,438,172 B1 | | 8/2002 | Nakamura et al. |
| 6,549,579 B2 | | 4/2003 | Nakamura et al. |

FOREIGN PATENT DOCUMENTS

| | | |
|---|---|---|
| JP | 6-125363 | 5/1994 |
| WO | WO 94/07332 | 3/1994 |

OTHER PUBLICATIONS

J. Yonemitsu, MPEG Technique, pp. 19-21, Trikeps, Dec. 21, 1993, ISBN 4-88657-15-2 (in Japanese).

* cited by examiner

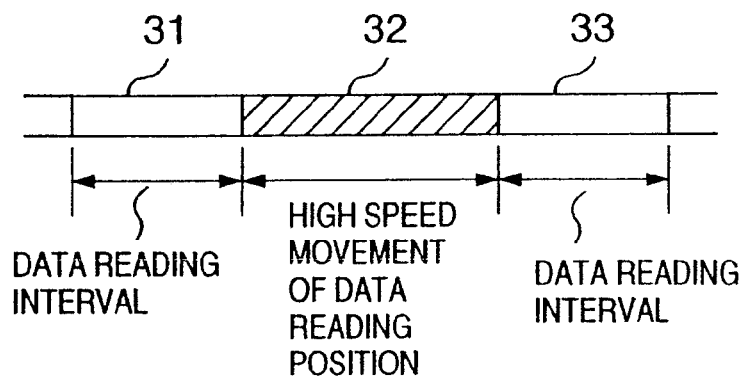
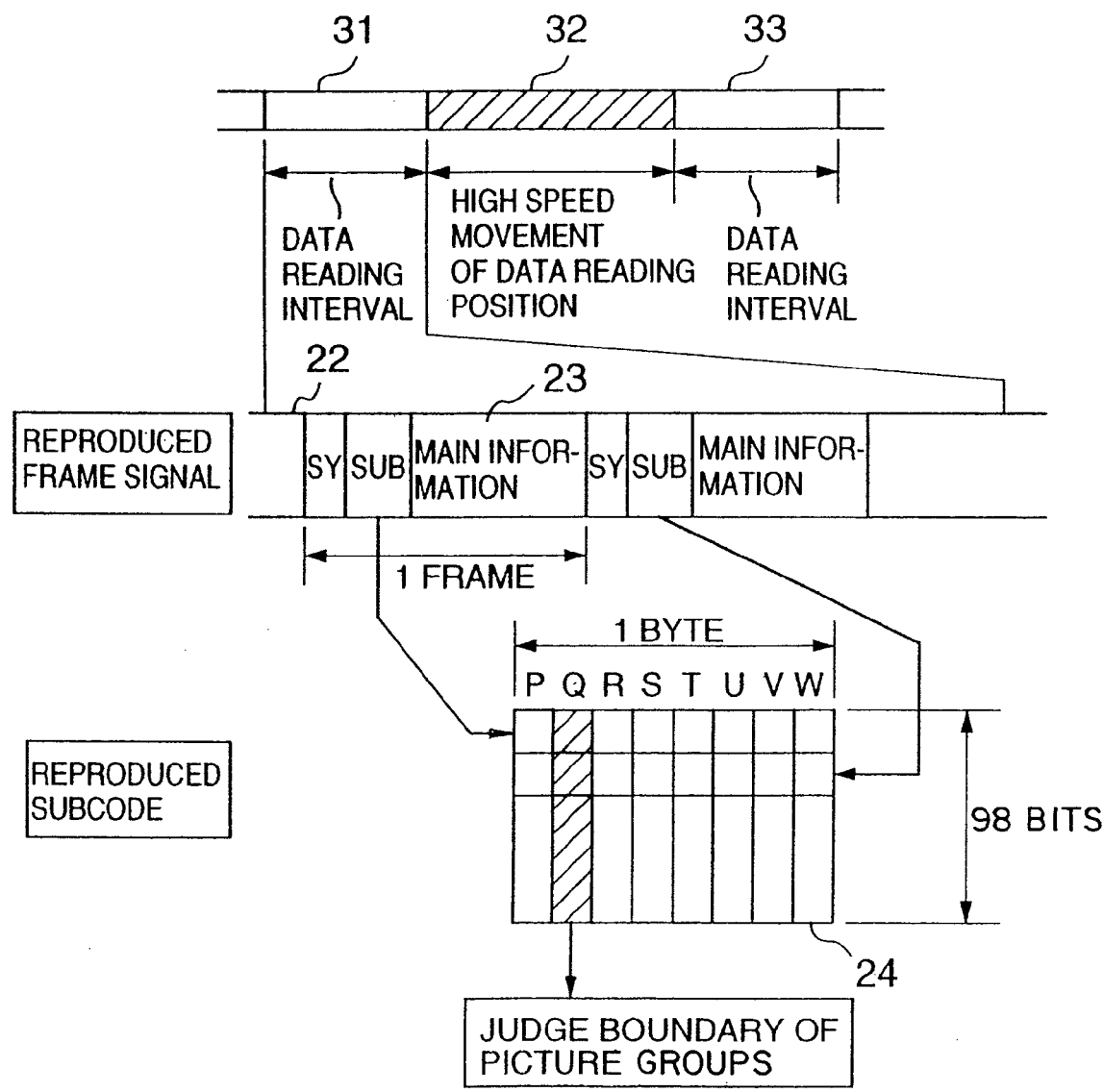
FIG.4

TRANSMITTING AND RECORDING METHOD, REPRODUCING METHOD, AND REPRODUCING APPARATUS OF INFORMATION AND ITS RECORDING MEDIUM

CROSS-REFERENCE TO RELATED APPLICATIONS

This application is a continuation of application Ser. No. 10/733,319 file Dec. 12, 2003, now U.S. Pat. No. 7,565,061 which is a continuation of application Ser. No. 10/252,581 filed Sep. 24, 2002 (now U.S. Pat. No. 6,693,966), which is a continuation of Ser. No. 10/051,066, filed Jan. 22, 2002 (now U.S. Pat. No. 6,549,579), which is a continuation of application Ser. No. 08/463,827, filed Jun. 5, 1995 (now U.S. Pat. No. 6,438,172). This application relates to and claims priority from Japanese Patent Application No. 06-136962, filed on Jun. 20, 1994. The entirety of the contents and subject matter of all of the above is incorporated herein by reference.

BACKGROUND OF THE INVENTION

The present invention relates to an apparatus for recording compressed video and audio signals on a medium such as an optical disk or the like and reproducing such signals from such a medium.

A compression of video and audio signals has been described in detail in Jun Yonemitsu (editorial supervisor), "MPEG Technique," pp. 19-21, published in Japan by Trikeps on Dec. 21, 1993. An example of an optical disk has been described in detail in Kenji Hayashi (editor and author), "CD- From Audio to Personal Computer," pp. 84-89, published in Tokyo, Japan, by Corona Publishing Co., Ltd., on Jul. 25, 1990.

A compression method of the video and audio signals and a corresponding decompression method have been described in the first reference listed above. A signal recording format of a compact disc (CD) has been described in the second reference listed above. However, a method of easily realizing a retrieving method when the compressed video and audio signals are recorded on a medium and are reproduced therefrom is not described.

In the case of reproducing the medium such as a CD or the like on which the compressed video and audio signals have been recorded in a data stream format as described in the "MPEG Technique" reference listed above, a picture or a boundary of a group of pictures can be judged by reproducing the data stream and judging header information of a pack and a packet. In the case of recording a signal on the medium, however, in order to improve an error resistance, an interleave process and an error correction encoding process which are peculiar to the medium and a frame forming process involving addition of a sync signal and sub information are ordinarily executed. When the picture or boundary of the picture group is judged by reproducing the data stream and judging the header information of the pack and the packet, therefore, a position of a pickup or the like which is reproducing data from the medium has already been deviated. Therefore, in the case of performing a retrieval, an editing operation, and the like on a picture or picture group unit basis, a complicated control is needed to find a position of the picture or boundary of the picture group on the medium, so that there is a problem such that it takes a long time to find the position.

SUMMARY OF THE INVENTION

It is an object of the invention to provide a transmitting and recording method, a reproducing method, and a reproducing apparatus of information which are suitable for retrieving and editing on a picture or picture group unit basis.

The above object is accomplished by a method whereby, when time sequential data of a pack is divided into a minimum unit of a data structure which is peculiar to a medium and is transmitted or recorded on the medium, information indicating whether or not a picture or a boundary of a picture group exists in the minimum unit of the data structure peculiar to the medium is described in a sub information portion in a frame signal to be transmitted or recorded when a frame forming process that is peculiar to the medium is executed.

In the case of performing a retrieval, an editing operation, or the like on a picture or a picture group unit basis, by reading the information which was reproduced from the medium and was written in the sub information portion in the frame signal peculiar to the medium and indicates whether or not the picture or the boundary of the picture group exists in the minimum unit of the data structure peculiar to the medium and by judging the information, a reproducing position on the medium at which to reproduce the picture or the boundary of the picture group can be accurately and easily detected. Thus, a complicated control to find the position of the picture or the boundary of the picture group is unnecessary, so that the picture or the boundary of the picture group can be retrieved at a high speed.

BRIEF DESCRIPTION OF THE DRAWINGS

FIG. 3 is an explanatory diagram showing a reproducing method of information according to the invention;

FIG. 4 is an explanatory diagram showing another embodiment of a reproducing method of information according to the invention.

DETAILED DESCRIPTION OF THE INVENTION

Embodiments of the invention will now be described with reference to the drawings.

Figure 1:
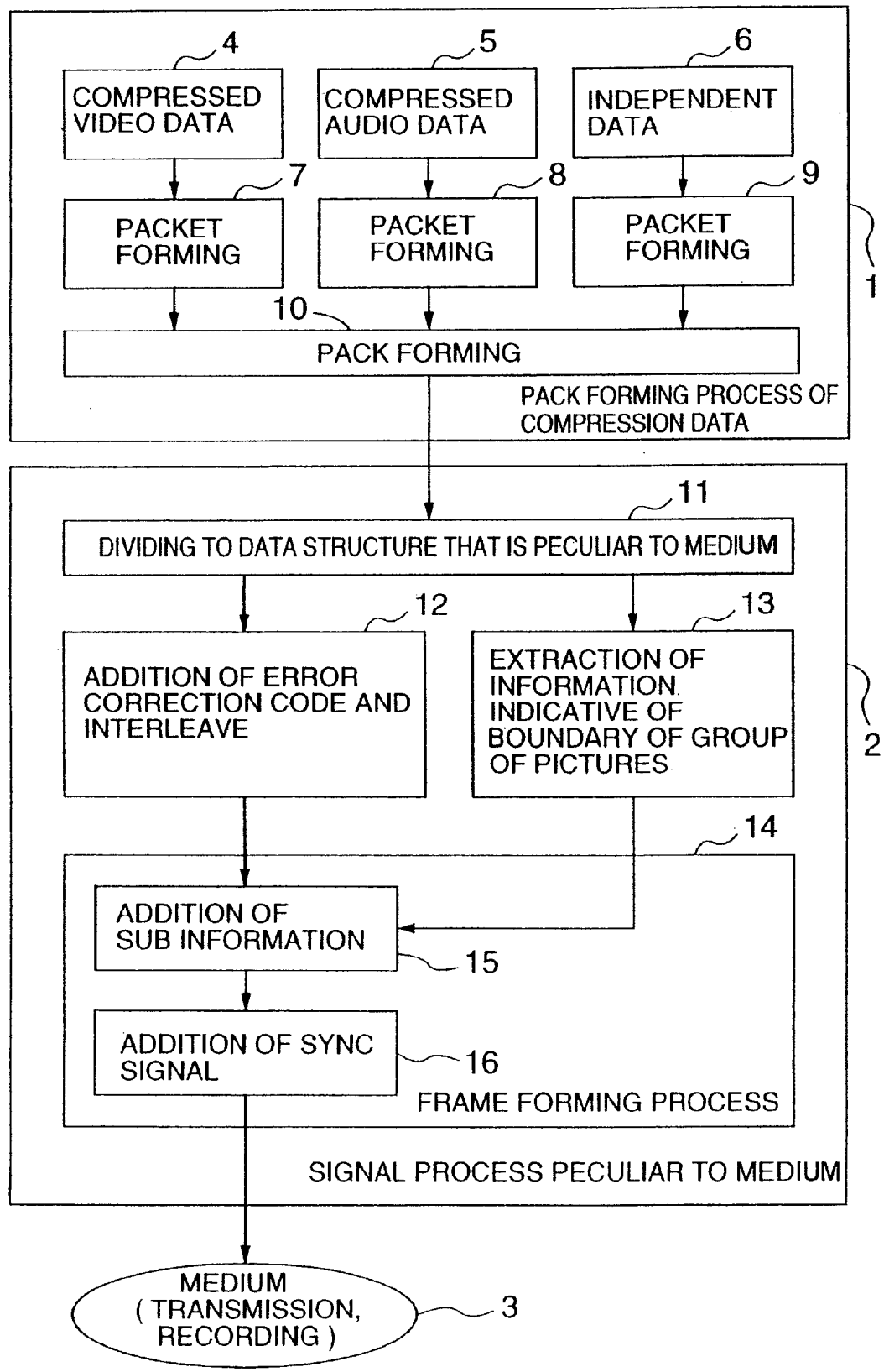
FIG. 1 is a block diagram showing an embodiment of a transmitting or recording method of information according to the invention.

FIG. 1 shows an embodiment of the invention and shows a transmitting or recording method of information. Reference numeral 1 denotes a pack forming process of compression data; 2 a signal process that is peculiar to a medium; 3 a medium to transmit or record information; 4 compressed video data; 5 compressed audio data; 6 independent data such as data or the like which is defined by the user; 7, 8, and 9 packet forming processes; 10 a pack forming process; 11 a process to divide time sequential data of a pack to a data structure that is peculiar to the medium; 12 main signal processes such as addition of an error correction code, interleave, and the like peculiar to the medium; 13 an extracting process of information indicating in which component element of a data structure a boundary of a group of pictures is included when the time sequential data of the pack is divided to the data structure peculiar to the medium; 14 a frame forming process for forming a frame signal peculiar to the medium; 15 a process to add sub information to the frame signal; and 16 a process to add a sync signal to every frame of the frame signal.

A method of transmitting information or forming a recording signal according to the invention will now be explained herein below with reference to FIG. 1.

In the pack forming process 1 of compression data, a packet header indicative of a head of the packet is added to each of the compressed video data, compressed audio data, and independent data, thereby forming packets. Each packet is time divided, one or more packets are collected, and a pack header indicative of the head of the pack and information indicative of a reference time are further added, thereby constructing a pack. In the signal process 2 peculiar to the medium, the time sequential data of the pack is first divided to the data structure peculiar to the medium.

When dividing, an extracting process of information indicating in which component element of the data structure the boundary of the picture group is included is performed. The divided time sequential data of the pack is subjected to signal processes such as addition of an error correction code, interleave, and the like in order to enhance an error resistance in accordance with a signal processing format peculiar to the medium. In order to transmit or record the signal processed data, a frame forming process peculiar to the medium according to a frame format is performed. In the frame forming process, sub information and a sync signal indicative of the head of the frame are added to the data which was subjected to the signal processes peculiar to the medium, thereby forming a frame signal.

According to the invention, information indicating in which component element of the data structure peculiar to the medium the boundary of the picture group is included is inserted in the sub information of the frame signal at the time of the frame forming process. If there is a channel code modulation rule which is suitable for recording or transmitting data for the frame signal and which has been decided in the medium and which is peculiar to the medium, the channel code modulation according to the modulation rule is executed for the data. If there is no channel code modulation rule, data is transmitted or recorded as it is by the medium.

According to the invention, the information indicating whether or not the head of data (for example, a group of pictures) of a certain unit of the compressed video data is included in the minimum unit of the data structure peculiar to the medium can be transmitted or recorded by using an area to transmit or record the sub information which is different from an area to transmit or record main information in the frame signal peculiar to the medium.

Another embodiment of the invention will now be described with reference to FIG. 2. The embodiment relates to a case where the invention is applied to a compact disc (CD), a CD-ROM, or a system having a data structure and a frame format which are equivalent to those of the CD-ROM.

Figure 2:
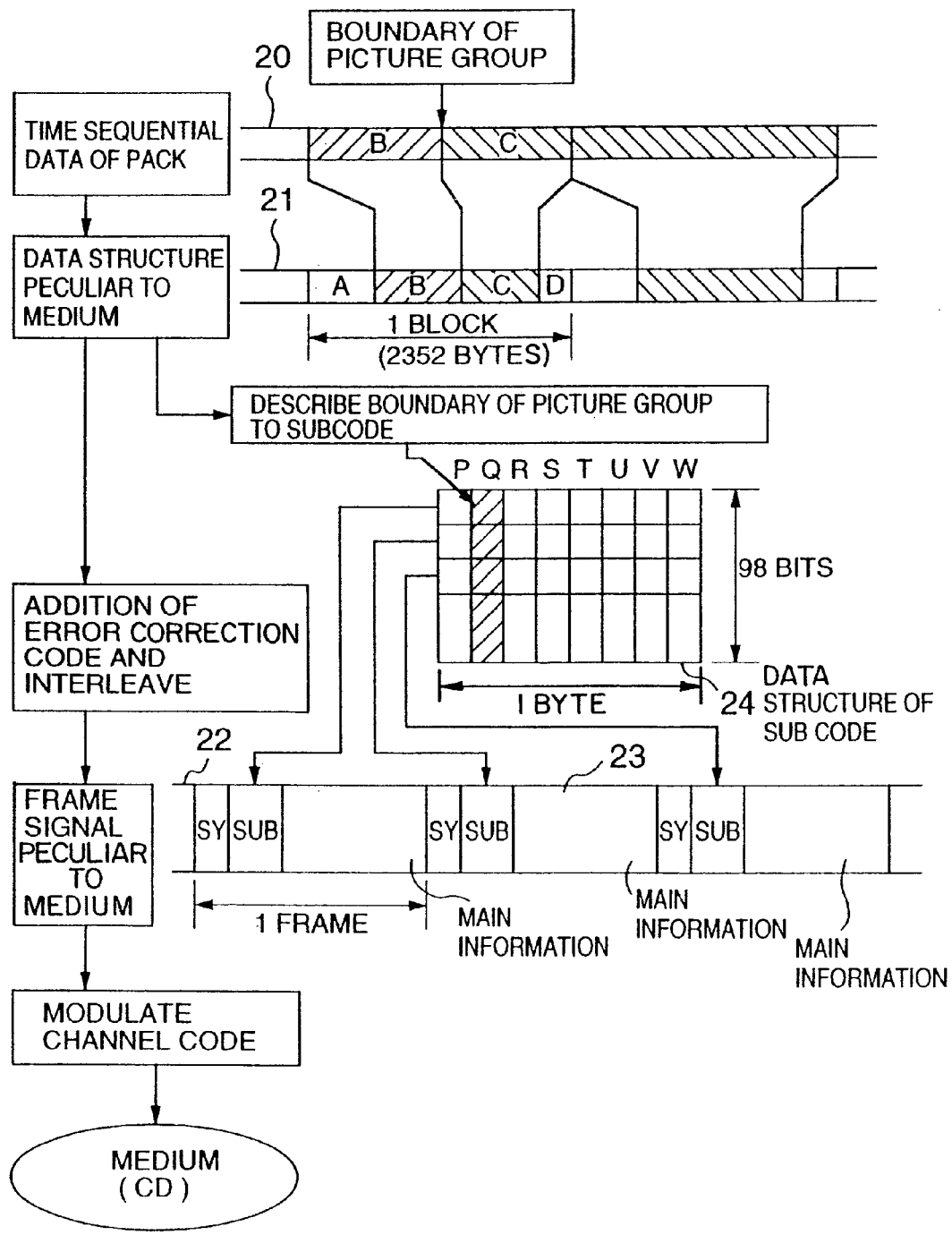
FIG. 2 is a block diagram and an explanatory diagram showing another embodiment of a recording method of information according to the invention.

In FIG. 2, reference numeral 20 denotes time sequential data of a pack. A boundary between B and C indicates a boundary of a group of pictures. A head of the C portion denotes a head of data of the picture group. Reference numeral 21 denotes a data structure which is peculiar to the medium; A a header section including a sync signal or the like; B and C data to which the time sequential data of the pack is divided and is allocated and which is equivalent to the B and C portions of the time sequential data of the pack; and D other data including a margin section. Such A, B, C, and D portions indicate minimum units of the data structure peculiar to the medium and are defined as one block. According to the invention, the number of bytes of one block is set to 2352 bytes.

Reference numeral 22 denotes a frame signal peculiar to the medium; SY a frame sync signal; SUB a subcode as sub information; and 23 a main information portion in the frame signal. In the embodiment, the main information portion 23 has a total of 32 bytes including 24 bytes of data and eight bytes of an error correction code (ECC). It is assumed that one frame is constructed by such a frame sync signal, subcode as sub information, and main information. Reference numeral 24 denotes a data structure of the subcode. The subcode is formed by eight kinds of codes such as P, Q, R, S, T, U, V, and W each having a code length of 98 bits. Data of eight bits obtained by collecting one bit from each code is inserted in the SUB portion in the frame signal.

A recording method of the embodiment will now be explained. The time sequential data of the pack is divided every number of bytes corresponding to the number of bytes of the data portion of the block as a minimum unit of the data structure peculiar to the medium, thereby allocating data to the data portion of each block. Upon allocation, it is detected that the boundary between the picture groups B and C exists in the block. A code indicative of the presence of the boundary is written, for example, in the Q code in the subcode. At the same time, the block formed data is subjected to the signal processes such as addition of an error correction code, interleave, and the like peculiar to the medium. When the signal processed data is frame formed, such data is allocated to the main information portion of the frame signal.

At the same time, the subcode is allocated to the SUB portion by the foregoing method. As mentioned above, the information indicative of the boundary of the picture group can be written in the subcode portion of the frame signal. The frame signal constructed as mentioned above is subjected to, for example, an 8-14 modulation (EFM) such that eight bits are allocated to 14 bits and, after that, the signal is recorded on a medium such as a CD or the like. According to the invention, information indicating whether or not the head of the picture group of the compressed video data is included in the block as a minimum unit of the data structure peculiar to the medium can be recorded on a CD, a CD-ROM, or a system having a data structure and a frame format which are similar to those of the CD-ROM by using an area to record the sub information in the frame signal peculiar to the medium.

The embodiment has been explained with respect to the case where the information indicative of the presence of the boundary is described in the subcode Q. However, even if such information is described in any one of the codes P, Q, R, S, T, U, V, and W without limiting it to the Q code, a similar effect is obtained. For example, a data start flag is described in the P code in the present CD. Information indicative of the presence of the boundary can be described in place of such a flag or in a portion of such a flag. By describing the serial number or an address of the head of the picture group of the compressed video data instead of the information indicative of the boundary, an even more accurate retrieval can be performed upon reproduction.

By not only describing the information indicative of the boundary and the serial number or address of the head of the picture group of the compressed video data but also simultaneously adding and describing a CRC code to detect reproduction errors of those data, a degree of accuracy of those data which are reproduced at the time of the retrieval can be improved. In the case where the information indicative of the boundary or the serial number or address of the head of the picture group of the compressed video data is recorded in the Q code, by describing them in place of the portion in which PMIN, PSEC, and PFRAME indicative of the minute, second, and frame of the reproducing time have been written in the present CD, the reproduction errors can be detected by the CRC code of the Q code in this state. Although graphic information has been described in the codes R, S, T, U, V, and W in the present CD, the information can be also described in such portions by a method similar to that of the P code described above.

Another embodiment of the invention will now be described with reference to FIG. 3. FIG. 3 shows a reproducing method according to the invention. Data reading intervals shown by 31 and 33 are intervals during which a reproducing apparatus reproduces data on a medium. A portion indicative of a high speed movement of a data reading position 32 is an interval during which the reproducing apparatus moves the reproducing position of data on the medium for a high speed retrieval. After the data reading position has been moved at a high speed upon high speed retrieval, the reproducing apparatus retrieves a target position on the medium while repeating the operation to read data.

According to the invention, in such a data reading interval, information which has been written in the sub information in the frame signal peculiar to the medium and which indicates whether or not the head of the data (for example, a picture group) of a certain unit of the compressed video data is included in the minimum unit of the data structure peculiar to the medium is judged and, on the basis of such information, the boundary of data of a certain unit of the compressed video data can be retrieved from the medium at a high speed. According to the embodiment, there is an effect such that the boundary of the data of the certain unit of the compression video data can be retrieved from the medium at a high speed.

Another embodiment of the invention will now be described with reference to FIG. 4. FIG. 4 shows a reproducing method according to the invention. The embodiment relates to a case where the reproducing method of the invention is applied to a CD, a CD-ROM, or a system having a data structure and a frame format which are similar to those of the CD-ROM. In FIG. 4, the same component elements as those in FIGS. 2 and 3 are designated by the same reference numerals.

In a manner similar to the embodiment shown in FIG. 3, the reproducing apparatus retrieves a target position on the medium while repeating the operation to read data after the data reading position has been moved by moving a pickup at a high speed upon high speed retrieval. A frame signal which is reproduced from the disk for the data reading interval is the same signal as the frame signal shown in FIGS. 2 and 4.

As for the subcode, the subcodes each comprising eight bits written in each frame for 98 frames are collected, thereby reproducing eight subcodes of P, Q, R, S, T, U, V, and W in which one code consists of 98 bits. Information which has been described in any one of those subcodes and indicates whether or not the head of the picture group of the compressed video data is included in the block as a minimum unit of the data structure peculiar to the medium is reproduced and a boundary of the picture group is judged, so that the boundary of the picture group can be retrieved at a high speed. According to the embodiment, there is an effect such that the boundary of data of a certain unit of the compressed video data can be retrieved from the medium at a high speed.

Figure 5:
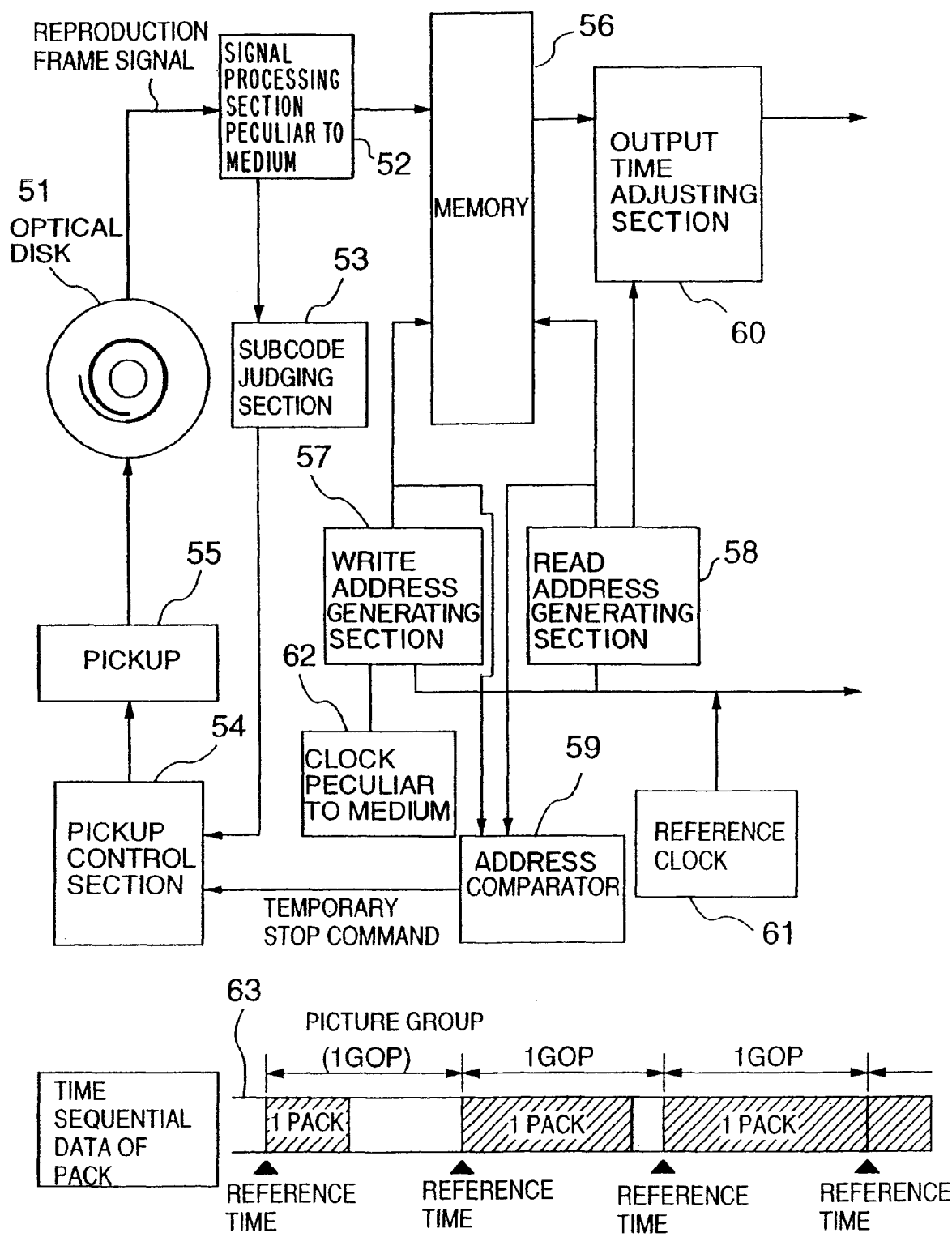
FIG. 5 is a block diagram and an explanatory diagram showing an embodiment of a reproducing apparatus of information according to the invention.

Another embodiment of the invention will now be described with reference to FIG. 5. FIG. 5 shows a reproducing apparatus according to the invention. This embodiment relates to a case where the reproducing apparatus of the invention is applied to a CD, a CD-ROM, or a system having a data structure and a frame format which are similar to those of the CD-ROM. In FIG. 5, reference numeral 51 denotes an optical disk; 52 a signal processing section peculiar to the medium; 53 a subcode judging section; 54 a pickup control section; 55 a pickup; 56 a memory; 57 a write address generating section; 58 a read address generating section; 59 an address comparator; 60 an output time adjusting section of time sequential data of a pack; 61 a reference clock; and 62 a clock peculiar to the medium.

The operation at the time of a high speed retrieval will be first described. Upon high speed retrieval, a frame signal reproduced from the optical disk 51 in the data reading interval is inputted to the signal processing section 52 peculiar to the medium, thereby separating a subcode and main information on the basis of a sync signal in the frame signal. The subcode is inputted to the subcode judging section 53, thereby judging whether or not the subcode indicates a boundary of a picture group. When the subcode does not indicate the boundary of the picture group, the pickup 55 is moved at a high speed by the pickup control section 54 and the judgment of the subcode is repeated. In the case where the subcode does indicate the boundary of the picture group, reproduction is performed. As mentioned above, the retrieval can be performed on a picture group unit basis.

The operation upon reproduction after completion of the retrieval will now be described. The reproduced frame signal is inputted to the signal processing section 52 peculiar to the medium and the subcode and the main information are separated on the basis of the sync signal in the frame signal. After that, the main information is subjected to processes such as error correction, deinterleave, and the like, thereby reproducing data of a block structure as a data structure peculiar to the medium. The data of the block structure is stored into the memory 56 in accordance with a write address which is generated by the write address generating section 57 on the basis of the clock 62 peculiar to the medium and the reference clock 61. The data stored in the memory 56 is read out in accordance with a read address which is generated by the read address generating section 58 on the basis of the reference clock 61 and is inputted to the output time adjusting section 60 of the time sequential data of the pack.

The write address and read address of the memory are always compared by the address comparator 59. When the write address differs from the read address by a predetermined amount or more, the pickup 55 is controlled by the pickup control section 54 to temporarily stop the reproduction. A speed to read the data from the optical disk 51 is always set to be equal to or larger than the maximum data transfer rate of the time sequential data of the pack and the reproduction control described above is executed, so that an excessive data or a lack of data between the reproducing apparatus and a decoding apparatus of the time sequential data of the pack to which an output of the reproducing apparatus is connected can be absorbed.

The data read out from the memory 56 is subjected to time base correction by the output time adjusting section 60 of the time sequential data of the pack. Reference numeral 63 shows a time base correction of the time sequential data of the pack. In the output time adjusting section 60 of the time sequential data of the pack, a time interval between the heads of adjacent packs is corrected with respect to the time base so as to be almost equal to a difference between the reference times in accordance with the reference time described in every pack of the data read out from the memory 56. Since an amount of data of one pack may be different for every pack, the data is outputted at the maximum data transfer rate in the time sequential data of the pack. In the case of a pack having a small amount of data, invalid data is outputted in the portion between the end of the pack to the head of the next pack or the data is outputted so as to indicate that such a portion contains invalid data. For instance, such a process can be realized by a method such that a signal indicative of valid or invalid data and synchronized with the data is generated together with the data, an identification signal is added to the invalid data portion, or the like. According to the embodiment as mentioned above, the reproducing apparatus which can retrieve the boundary of the picture group at a high speed and can perform a normal reproduction can be constructed.

Explanations will now be made with reference to FIG. 5 with respect to a case where when a video signal is compressed, for example, encoded data is recorded on an optical disk while changing a data compression ratio for every picture group and is reproduced by the present method.

A Group of Pictures (GOP) is constructed as a picture group by using several video frames as a unit. A compression ratio is changed on a GOP unit basis, thereby compressing the video signal. The compressed video signal is subsequently divided into several packs. A reference time signal is added to the head of the pack and the pack is recorded. On the optical disk 51, the recording is executed at a constant recording density irrespective of the packs of the GOP of different compression ratios.

Upon reproduction, an output time of the time sequential data of the pack is adjusted so that a time interval between the heads of the packs is equal to a time difference between the reference time signals added to the heads of the packs.

By executing the reproduction as mentioned above, the data encoded so that the compression ratio of the data is changed on a GOP unit basis can be also accurately reproduced.

Although the embodiment relates to an example of the case where one GOP is set to one pack, in the case of recording data of one GOP by dividing it to several packs, the data can be also reproduced in a similar manner.

According to the invention, the information indicating whether or not the head of data (for example, the picture group) of a certain unit of the compressed video data is included in a minimum unit of the data structure peculiar to the medium can be transmitted or recorded by using an area to transmit or record the sub information which is different from an area to transmit or record the main information in the frame signal peculiar to the medium. According to the invention, the boundary of the data of a certain unit of the compressed video data can be retrieved at a high speed from the medium. Further, the reproducing apparatus which can retrieve the boundary of the picture group at a high speed and perform a normal reproduction can be constructed.

While example embodiments may be described herein, it is understood that such is presented by way of illustration only, and are not to be taken as limiting or exhaustive in any way. Many modifications, adaptations, variations and equivalents are apparent as being well within the scope of the appended claims.

What is claimed is:

1. A method of reproducing data from a recording medium, each of the data including an error correction code and reference time information indicating a reference time and including packet data, the method comprising:
   reproducing the data from the recording medium;
   performing error correction on the reference time information and the packet data using the error correction code in the reproduced data;
   obtaining a reference time difference between respective reference times indicated by the reference time information of reproduced adjacent data;
   rearranging the data on a time axis such that a time interval between adjacent data is equal to the obtained reference time difference; and
   outputting the rearranged data.

2. An apparatus for reproducing data from a recording medium, the data including an error correction code and reference time information indicating a reference time and including packet data, the apparatus comprising:
   a reproducing circuit which reproduces the data from the recording medium;
   an error correction circuit which performs error correction on the reference time information and the packet data using the error correction code in the reproduced data;
   a memory which stores the data reproduced by the reproducing circuit and error-corrected by the error correction circuit; and
   an outputting circuit which reads the data from the memory, obtains a reference time difference between respective reference times indicated by the reference time information of read adjacent data, rearranges the data on a time axis such that a time interval between adjacent data is equal to the obtained reference time difference, and outputs the rearranged data.

* * * * *